(12) United States Patent
Kreisz et al.

(10) Patent No.: US 7,022,162 B2
(45) Date of Patent: Apr. 4, 2006

(54) USE OF A MATERIAL AND A METHOD FOR RETAINING POLYHALOGENATED COMPOUNDS

(75) Inventors: Siegfried Kreisz, Karlsruhe (DE); Hans Hunsinger, Weingarten (DE)

(73) Assignee: Forschungszentrum Karlsruhe GmbH, Karlsruhe (DE)

( * ) Notice: Subject to any disclaimer, the term of this patent is extended or adjusted under 35 U.S.C. 154(b) by 0 days.

(21) Appl. No.: 10/468,109

(22) PCT Filed: Feb. 14, 2002

(86) PCT No.: PCT/EP02/01531

§ 371 (c)(1),
(2), (4) Date: Mar. 24, 2004

(87) PCT Pub. No.: WO02/064235

PCT Pub. Date: Aug. 22, 2002

(65) Prior Publication Data

US 2004/0144252 A1    Jul. 29, 2004

(30) Foreign Application Priority Data

Feb. 15, 2001 (DE) ............... 101 06 934
Dec. 24, 2001 (DE) ............... 101 64 066

(51) Int. Cl.
B01D 53/04 (2006.01)

(52) U.S. Cl. ............... 95/142; 95/143; 95/901

(58) Field of Classification Search .......... 95/143–147, 95/901; 96/135, 153, 4, 14
See application file for complete search history.

(56) References Cited

U.S. PATENT DOCUMENTS

| | | | | |
|---|---|---|---|---|
| 3,217,715 A | * | 11/1965 | Berger et al. ................ 131/342 |
| 3,474,600 A | * | 10/1969 | Tobias ......................... 55/524 |
| 3,538,020 A | * | 11/1970 | Heskett et al. ............... 210/496 |
| 3,645,072 A | * | 2/1972 | Clapham ...................... 96/153 |
| 3,704,806 A | * | 12/1972 | Plachenov et al. .......... 206/204 |
| 3,721,072 A | * | 3/1973 | Clapham ...................... 96/153 |
| 3,862,056 A | | 1/1975 | Hartman |
| 3,919,369 A | * | 11/1975 | Holden ....................... 264/45.1 |
| 4,013,566 A | * | 3/1977 | Taylor ......................... 502/62 |
| 4,124,529 A | * | 11/1978 | Juntgen et al. .............. 502/432 |
| 4,540,625 A | | 9/1985 | Sherwood |
| 4,677,086 A | * | 6/1987 | McCue et al. ................ 502/62 |
| 5,033,465 A | * | 7/1991 | Braun et al. ........... 128/205.27 |
| 5,256,476 A | * | 10/1993 | Tanaka et al. ................. 442/1 |
| 5,260,047 A | | 11/1993 | Berger |
| 5,332,426 A | * | 7/1994 | Tang et al. ................... 96/153 |
| 5,595,586 A | | 1/1997 | Sivavec |
| 5,595,649 A | | 1/1997 | Markell et al. |
| 5,595,659 A | | 1/1997 | Huang et al. |
| 5,662,728 A | * | 9/1997 | Groeger ........................ 96/153 |
| 6,153,422 A | | 11/2000 | Kashiba |
| 6,277,178 B1 | * | 8/2001 | Holmquist-Brown et al. . 96/135 |
| 6,277,179 B1 | * | 8/2001 | Reymonet ..................... 96/153 |
| 6,429,165 B1 | * | 8/2002 | Nastke et al. ................ 502/159 |
| 6,451,723 B1 | * | 9/2002 | Gaita et al. .................... 502/62 |
| 6,726,751 B1 | * | 4/2004 | Bause et al. ................... 96/134 |
| 2003/0110948 A1 | * | 6/2003 | Gaita et al. ................... 96/108 |

FOREIGN PATENT DOCUMENTS

| | | |
|---|---|---|
| DE | 44 25 658 C1 | 10/1995 |
| EP | 0 945 176 A | 9/1999 |
| JP | 03080104 A | 4/1991 |
| JP | 10314581 A1 | 12/1998 |

* cited by examiner

*Primary Examiner*—Robert H. Spitzer
(74) *Attorney, Agent, or Firm*—Venable LLP; Robert Kinberg; Marina V. Schneller

(57) ABSTRACT

It is the object of the invention to provide a material for retaining polyhalogenated compounds, the material avoiding the drawbacks of activated carbon and polyolefins. The object is accomplished by the use of a material for retaining polyhalogenated compounds, having a filler, which is suitable for adsorbing polyhalogenated compounds, and a polyolefin matrix, into which the material is completely incorporated and enclosed.

16 Claims, 1 Drawing Sheet

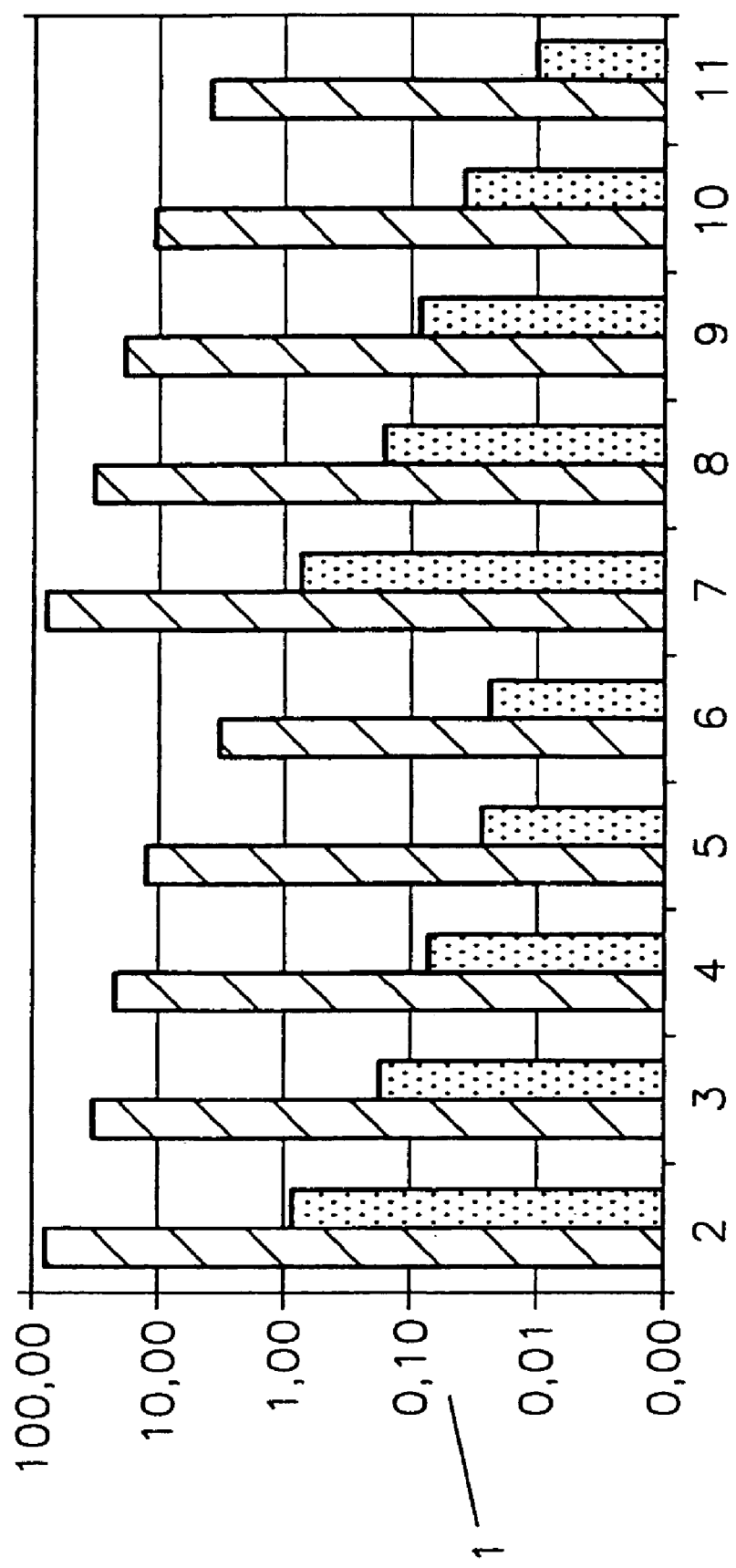

USE OF A MATERIAL AND A METHOD FOR RETAINING POLYHALOGENATED COMPOUNDS

The present invention relates to a use of a material for retaining polyhalogenated compounds, comprising a filler and a polyolefin matrix, into which the filler is completely incorporated and enclosed, and a method for retaining polyhalogenated compounds.

Polyhalogenated compounds include polychlorinated dibenzo-p-dioxines and dibenzofurans (PCDD/F), which form in burning processes, as well as in incineration processes, and are carried off with the waste gas. Because of the toxicity of these compounds, lawmakers in the Federal Republic of Germany decreed a limit for the emission of the compounds from incineration facilities of 0.1 Ng TEQ/Nm$^3$ (TEQ=Toxicity EQuivalent) in the 17$^{th}$ Federal Emissions Protection Ordinance (17. BImSchV). It is now known that this limit for PCDD/F in burner gas cannot be met solely through the optimization of the burning conditions. The concentration of PCDD/F in the burner gas must therefore be reduced below the prescribed limit with an additional flue-gas purification following the burning process.

With modern technology, PCDD/F compounds are removed as early as possible in the flue-gas-purification process in incineration facilities. This is effected immediately after the incineration, in the dust-laden burner gas (crude gas) with the use of special catalysts and at high temperatures, or on the fabric filter used as the dusting machine with the use of an additive (entrained-bed process), or with a catalyst integrated into the fabric filter (REMEDIA method from Gore). In the course of normal operation, all of these methods result in PCDD/F concentrations in the burner gas that are well below the legal emission limit value of 0.1 Ng TEQ PCDD/F/Nm$^3$. No additional equipment is required for separating out the PCDD/F in the further burner gas path. Downstream, additional flue-gas-purification stages (e.g. wet-washing systems) are only subjected to small quantities of PCDD/F.

In addition to the above-described flue-gas-purification methods, it is advantageous to employ methods in combination with burner-gas-purification systems that are disposed downstream in the burner-gas flow, and contain components that adsorb or absorb polyhalogenated compounds.

One use of activated carbon for retaining harmful substances is known from Thomas Löser's publication, "Einsatz von Aktivkohlen zur PCDD/F-Minderung [The Use of Activated Carbon for Reducing PCDD/F]," Abfallwirtschaftsjournal [Waste Management Journal] 4 (1992), No. 11, pp. 893–902. This article emphasizes the noteworthy suitability of activated carbon for retaining mercury and chlororganic compounds in flue-gas purification. This means, however, that, in the laden state, the activated carbon is heavily contaminated with mercury, and accordingly must be disposed of in a costly manner. The Applicant's own experiments have shown that the use of activated carbon in wet-washing systems leads to large amounts of impurities in the washing water, for example because of dust, and necessitates the use of additional filters.

It is generally known that the adsorption bonding of PCDD/F to carbon (C) in particular is so strong that a desorption of adsorbed PCDD/F's can virtually be ruled out at the temperatures present in the wet-washing systems, i.e., a maximum of 100° C.

DE 44 25 658 C1 discloses a method for retaining polyhalogenated compounds, in which a waste gas is conducted through a fixed bed with filler bodies comprising a polyolefin, such as polypropylene (PP). In this instance, it is notable that PP is especially suitable as an absorption material for PCDD/F retention from a flue gas, whereas polyolefins do not absorb mercury, so it must be removed separately. The particles of the fixed bed, in contrast, can be regenerated through a desorption of the absorbed polyhalogenated compounds.

Especially in incineration facilities employing wet-washing systems, PP is usually used as a material (e.g. as a filler material or drip precipitator), but a problem associated with this is that the PCDD/F content in the flue gas varies as a function of the operating state. In the worst-case scenario, a portion of the PCDD/F that has been incorporated into the wet-washing system in small concentrations is absorbed into the PP and concentrated. In non-standard operation (startup and shutdown times, malfunctions), significantly increased PCDD/F concentrations in the flue gas are to be expected. This leads to a severe PCDD/F contamination of the PP components, and means that, after an extended operating period of the wet-washing systems, the PCDD/F are so strongly concentrated in the PP that even small changes to the operating state, for example temperature fluctuations, cause a PCDD/F desorption. The PCDD/F from the flue gas is not irreversibly fixed in the PP; instead, an absorption/desorption equilibrium that is heavily dependent on the temperature and the PCDD/F concentration exists.

Basically, the desorption of PCDD/F from the PP also takes place in a purification system that includes a fixed bed of PP shaped bodies; a gas that is to be purified flows through the bed in a dry state, without condensation or the addition of a fluid.

Low-chlorinated PCDD/F's are likely to be desorbed from the PP, and therefore may cause the permissible TEQ value to be exceeded. Depending on the operating state, the TEQ value in the waste gas can even increase as the gas flows through the wet-washing system. Therefore, these systems either must be equipped with an additional aggregate for separating out PCDD/F's at the end of the flue-gas-purification path ("police filters"), or the release of PCDD/F's from the wet-washing system must be prevented.

In this connection, refer to the juxtaposition of two methods in WO 98/41310; in one method, fine carbon particles (C particles) are added to the wash water of a wet-washing system, while in the other method, surfactants are added. In both methods, these additives remove the PCDD/F from the flue gas, thereby effecting a reliable reduction of the PCDD/F concentration in the waste gas. These methods, however, require additional metering and capturing devices; in other words, they intervene in the process in a complicated manner, and may have a detrimental effect on the properties of the wet-washing system by causing sludge or foam formation. Furthermore, in both methods, if the drip precipitation following the wet-washing system is inadequate, it cannot be ruled out that fine particles (C particles or aerosol droplets) containing concentrated PCDD/F will be incorporated into the waste-gas flow and emitted.

In view of the above description, it is the object of the invention to propose a material for retaining polyhalogenated compounds, and a method that employs this polyolefin-based material, in the example for retaining PCDD/F's, the method avoiding the cited drawbacks of activated carbon and polyolefins.

The object is accomplished by the use of a material having a filler, which is suitable for adsorbing polyhalogenated compounds and is thereby completely incorporated into and enclosed in a matrix comprising a polyolefin, preferably polypropylene (PP) (filler-doped polyolefin). The filler is preferably in particle, granulate or powder form, and is quasi-homogeneous, that is, uniformly incorporated and distributed through the volume of the polyolefin matrix, with the filler and the matrix, which are present as components, forming the material. Ideally, each individual filler particle is completely surrounded by the matrix, so the polyolefin material ideally constitutes the entire surface of the components.

In accordance with the invention a complete incorporation is understood to mean the technically most complete possible incorporation, enclosure and covering of the filler by the polyolefin under economical conditions, preferably between 80 and 100%. At least the majority of the harmful substances should diffuse through the polyolefin matrix to the filler. With regard to the polyolefin covering the filler, it must be pointed out that the material must be produced and used in large quantities. Absolutely complete coverage is not possible with corresponding, suitable large-scale production methods, although complete coverage is achieved on a laboratory scale. In the incorporation of filler particles into polyolefin through the aforementioned large-scale methods, it has happened repeatedly that surface regions of the activated carbon are not covered with polyolefins. On paper, such material may produce a streak comprising filler dust. This type of material is, however, suitable for the purposes of the invention.

It is advantageous that not only the superior properties of polyolefins, namely their mechanical and chemical stability and the absorption of PCDD/F's, are assured, but an undesired desorption of the PCDD/F's from the material is extensively avoided. This is particularly apparent when the adsorption or absorption capability of the fillers is greater than that of the polyolefin matrix. For this reason, it is not desirable for the absorption material to be regenerated through a desorption of the polyhalogenated compounds. Consequently, for the material to be disposed of through incineration with few problems, and thus at low cost, its constitution must be such that all removed substances are destroyed in the incineration process. The removal of certain problematic substances, such as mercury, is undesired and should be extensively precluded.

Because polyhalogenated compounds diffuse well into polyolefins and are uniformly incorporated, i.e., absorbed, into the volume, the particles of the filler, which are not in direct contact with the waste gas to be purified or the washing fluid, are accessible for an absorption or adsorption of polyhalogenated compounds.

In the process, the property of polyolefins in general, and PP in particular, as a diffusion block for mercury is utilized to advantage to avoid loading mercury in the filler incorporated into the matrix. The adsorption capacity of the filler is therefore retained exclusively for loading with polyhalogenated compounds.

Substances that contain carbon are the preferred filler material. As mentioned at the outset, the adsorption bonding of halogenated compounds, especially of PCDD/F to carbon (C), is especially strong. Therefore, activated carbon, soot or finely ground hearth-furnace coke is especially well suited as a filler particle in a polyolefin matrix.

Particularly in the use of carbon as a filler, the incorporation of a filler into a polyolefin matrix advantageously reduces the formation of dust from carbon components, and therefore considerably reduces the tendency toward contamination mentioned at the outset.

A number of components of a purification system can be produced from the polyolefin doped in this manner. It is practically of no consequence whether the purification system is a wet-washing system or one in which the gas to be purified is purified in a dry state, that is, without condensation or the addition of a fluid. A classic area of application for the filler-doped polyolefin is the conventional filler bodies of a bed material in the fixed bed, which can easily be produced from the filler-doped polyolefin instead of from polyolefin, without additional changes. As an alternative, other filler bodies can be produced from filler-doped polyolefin; these have a large specific surface area and a small maximum material thickness, and the entire surface is conducive to being flowed past. Examples include fabric mats, fibers, chips, strips, granular materials or molded parts produced through injection molding.

Other components, such as the drip precipitator, pipe cladding or other structural elements of a wet-washing system that come into direct contact with the burner gas or the wash water, also represent a field of application for the doped PP. The components that were previously produced from PP can advantageously be replaced with components produced from doped PP without fundamental structural changes being made to the wet-washing system. These components also include retaining elements or containers for the filler bodies that permit a flow-through of gas.

In the use of the filler-doped polyolefin, it is essentially irrelevant whether the use takes place in a wet-washing system or in a purification system that includes a fixed bed of shaped bodies and can be flowed through by gas in a dry state, without condensation and without the addition of a fluid.

An injection-molding method, among others, is suitable for producing components from the filler-doped polyolefin. A dual screw-type extruder, among others, is suitable for mixing the filler with the matrix material. The proposed mixing process can be integrated into the production process with an injection-molding method.

In the following exemplary embodiment, the absorption properties of PP are improved through the introduction of carbon, preferably activated carbon, soot or finely ground hearth-furnace coke as the filler. The carbon content in the PP is in a range of 0.1 to 30 percent by weight. A particular advantage is that, not only is the reliability of the PCDD/F retention increased considerably, but the service life of the packed-bed filters is lengthened significantly.

The exemplary embodiment describes the removal of polyhalogenated compounds, for example PCDD/F's, from burner gases.

FIG. 1 illustrates, in logarithmic fashion, the degree of desorption 1 as a percentage (ratio of desorbed quantity of PCDD/F to the total load of PCDD/F in the filler body) for different PCDD/F's with different chlorination stages in pure PP (left bar of each pair) and in PP doped with about 10 percent by weight of C (right bar of each pair). In the data acquisition, a filler body loaded with a preset quantity of PCDD/F was subjected to an air flow of 250 Nl/h at 120° C. for 24 hours, and the PCDD/F that was desorbed into the air flow was determined. FIG. 1 shows the degree of desorption as a function of the degree of chlorination for the examples of TCDF 2, PeCDF 3, HxCDF 4, HpCDF 5, OCDF 6, TCDD 7, PeCDD 8, HxCDD 9, HpCDD 10 and OCDD 11. It is apparent that the degree of desorption from the C-doped PP is lower than the desorption from the undoped PP by a factor of 100.

The invention claimed is:

1. A process for absorbing at least one polyhalogenated compound, comprising
diffusing said at least one polyhalgenated compound through a material wherein said material comprises a polyolefin matrix and a filler,
wherein said filler is uniformly incorporated and distributed through the polyolefin matrix and is in particle, granulate or powder form and which filler adsorbs said at least one polyhalogenated compound;
allowing said filler to absorb said at least one polyhalogenated compound.

2. The process of claim 1, wherein the filler comprises carbon.

3. The process of claim 1, wherein the filler comprises carbon particles selected from the group consisting of activated carbon, soot, or finely ground hearth-furnace coke.

4. The process of claim 1, wherein the polyolefin of the matrix is a polypropylene (PP).

5. The process of claim 1, wherein said material is in the form of a component or filler bodies for waste-gas-purification systems.

6. The process of claim 5, characterized in that the components or the filler bodies are selected from the group consisting of fabric mats, fibers, chips, strips, granular materials and shaped bodies produced through injection molding.

7. The process of claim 5, characterized in that the components further include retaining elements or containers for the filler bodies, and other components of the waste-gas-purification system.

8. The process of claim 5, characterized in that the waste-gas-purification system is a wet-washing system.

9. The process of claim 5, characterized in that the waste-gas-purification system includes a fixed bed that comprises shaped bodies, and can be penetrated by gas in a dry state, without condensation or the addition of a fluid.

10. The process of claim 5, wherein the component is produced in an injection-molding method with the use of a dual screw-type extruder for mixing the filler with the matrix material.

11. The process of claim 1, wherein said material comprises 0.1 to 30 percent by weight of said filler.

12. The process of claim 1, which further comprises purifying burner gases by a wet-washing system.

13. The process of claim 12, in which the filler comprises activated carbon, soot or finely ground hearth-furnace coke.

14. The process of claim 12, wherein the polyhalogenated compounds are selected from the group consisting of polychiorinated dibenzo-p-dioxines, dibenzofurans and admixtures thereof.

15. The process of claim 1, in which the filler comprises carbon (C) having strong adsorptive properties for polyhalogenated compounds.

16. The process of claim 1, wherein the polyhalogenated compounds are selected from the group consisting of polychlorinated dibenzo-p-dioxines, dibenzofurans and admixtures thereof.

* * * * *